Dec. 2, 1924.

W. B. SEWELL 1,517,590

BUMPER FOR MOTOR DRIVEN VEHICLES

Filed Feb. 18, 1924  2 Sheets-Sheet 1

INVENTOR.
W. B. Sewell
BY
ATTORNEY

Dec. 2, 1924.
W. B. SEWELL
1,517,590
BUMPER FOR MOTOR DRIVEN VEHICLES
Filed Feb. 18, 1924    2 Sheets-Sheet 2
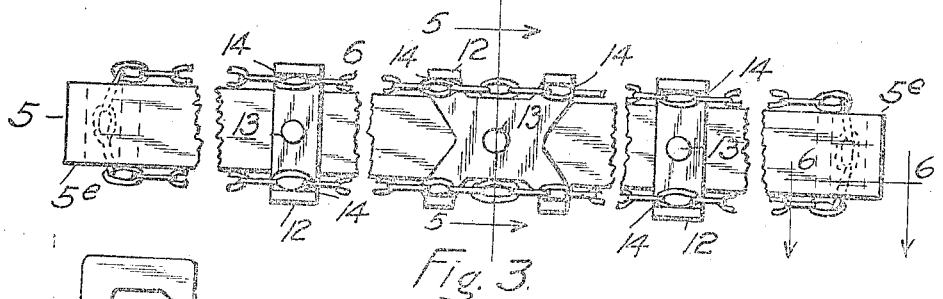
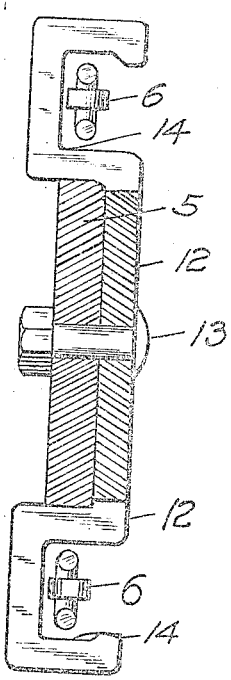
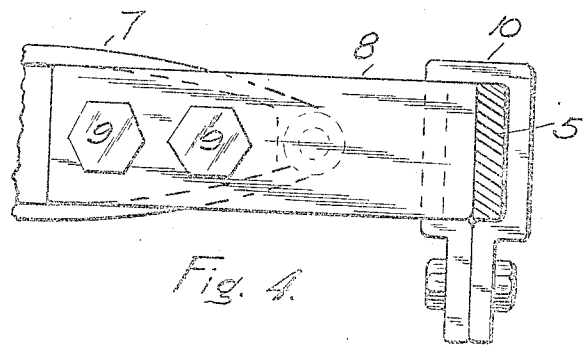
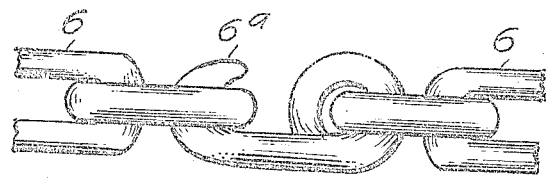
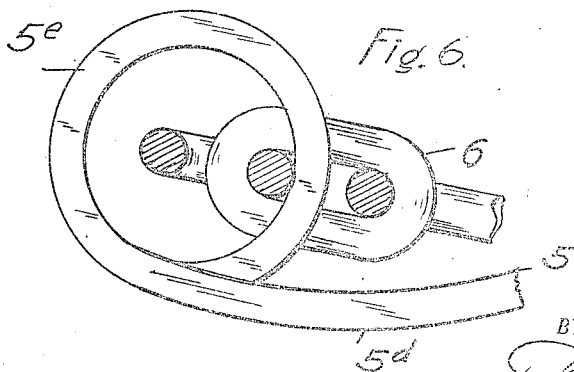
INVENTOR.
W. B. Sewell
BY
ATTORNEY.

Patented Dec. 2, 1924.

1,517,590

UNITED STATES PATENT OFFICE.

WILLIAM B. SEWELL, OF DENVER, COLORADO.

BUMPER FOR MOTOR-DRIVEN VEHICLES.

Application filed February 18, 1924. Serial No. 693,566.

*To all whom it may concern:*

Be it known that I, WILLIAM B. SEWELL, a citizen of the United States, residing at Denver, in the county of Denver and State of Colorado, have invented certain new and useful Improvements in Bumpers for Motor-Driven Vehicles, of which the following is a specification.

My invention relates to shock-absorbing bumpers for motor driven vehicles and its primary object is to provide a bumper in which the co-operative assemblage of two resilient elements provides a high degree of efficiency in resisting and deadening shocks of concussion in the event of its engaging with an object resisting the movement of the vehicle to which it is applied.

A further object of the invention is to provide in a bumper of the above stated character, a detachable element capable of being separately employed as a tow line or for any other purpose in which the services of strong chain rope or cable are desirable.

Still other objects of my invention reside in details of construction and a novel arrangement of parts as will fully appear in the course of the following description.

A preferred embodiment of my invention is illustrated in the accompanying drawings in the several views of which like parts are similarly designated and in which—

Figure 1:
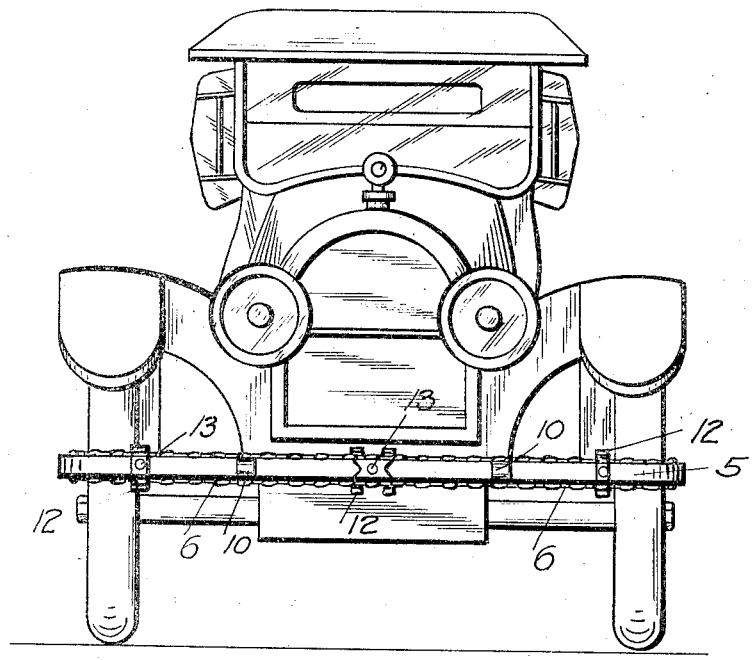
Figure 2:
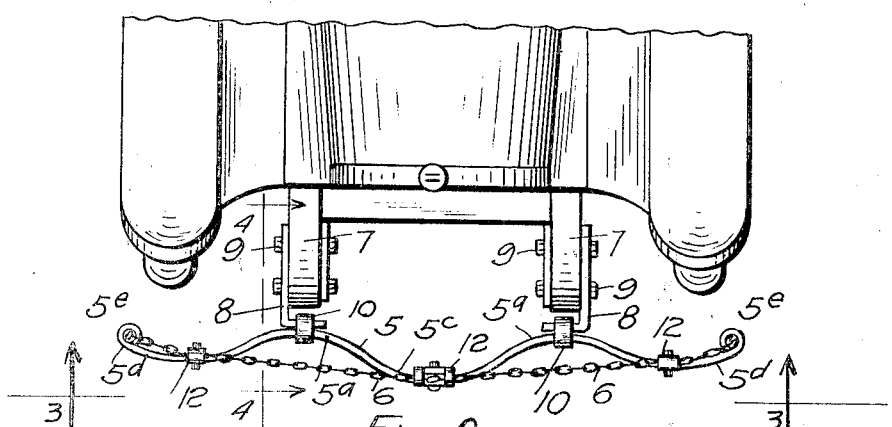

Figure 1 represents a front elevation of a motor vehicle equipped with a bumper made in accordance with my invention;

Figure 2, a fragmentary top view of the forward part of the vehicle to which the bumper is attached;

Figure 3, a fragmentary front view of the bumper looking in the direction of the arrows across the line 3—3 in Figure 2, and drawn to an enlarged scale;

Figure 4, a further magnified section taken on the line 4—4, Figure 2;

Figure 5, a still further enlarged section on the line 5—5, Figure 3;

Figure 6, an enlarged fragmentary and partially sectional top view of one of the ends of the bumper; and Figure 7, a fragmentary view of the chain-element of the bumper showing a method of connecting the ends thereof.

Referring more specifically to the drawings, my improved bumper comprises in co-operative association an elastic spring-element 5 and a flexible chain-element 6.

In the following detailed description the two elements are briefly referred to as the spring and the chain with the understanding that the word "spring" includes any elastic device of the required shape irrespective of its specific construction and that in employing the term "chain," any flexible device of the same character such as a wire rope or cable, is included.

The spring 5 consists of a bar of duplex reverse curvature which is attached to the vehicles at the vertices of two rearwardly curving portions $5^a$ at opposite sides of a central forwardly directed convergency $5^c$.

The end-portions $5^d$ of the spring are bent slightly rearwardly and formed into loops $5^e$ for the attachment of the chain as will hereinafter be more fully described.

The bumper is attached to a convenient part of the vehicle, preferably at the ends of the forwardly pointing chassis horns 7, by means of L-shaped brackets 8 which are rigidly fastened to the horns by means of bolts 9 and which engage in sleeves 10 on the before mentioned rearwardly extending curved portions $5^a$ of the spring.

The spring is furthermore provided with three channeled retention plates 12 one of which is fastened centrally of the convex portion $5^c$ of the spring and the others of which are secured adjacent to and at equal distances from the extremities of the same.

The plates are fastened to the spring by means of central bolts or rivets 13 and their end portions bent over the upper and lower edges of the same, are formed to provide channeled seats 14 for the chain 6.

The chain has, as shown in Figure 7 of the drawings, at one of its ends a hook-shaped link $6^a$ which when passed through the link at the opposite end of the chain connects it in endless continuity. Hooks of the character shown may if so desired, be applied at both ends of the chain to facilitate the connection or detachment of the ends.

The chain in its operative position is reeved through the loops $5^e$ at the ends of the spring, its ends are fastened together as shown in the drawings and hereinbefore explained, and its upper and lower stretches engage in the seats 14 of the retaining plates 12.

With the chain in this position, the spring is tensioned by rearward stress on its extremities and the chain is by the reciprocal action of the spring held taut between the points at which it engages the same.

The two elements thus interconnected cooperate to provide a bumper of more than ordinary strength and shock-absorbing qualities, well adapted to resist and deaden the shocks of concussion in the event of its impact with any object accidentally encountered by the motor vehicle to which it is applied.

The chain which is easily detached from the spring of the bumper, furthermore provides a convenient contrivance serviceable and advantageous in emergencies, since it is particularly adapted for use as a tow line and is besides a valuable aid in the repair of broken parts and a handy make-shift in providing traction on muddy or slippery roads.

The chain is readily connected to the spring by first reeving it through the loops at the extremities thereof, then fastening its ends together and finally springing it in place in the seats of the retention plates by inward pressure on the central convex portion of the spring, and it is detached with equal ease by moving it out of the seats of the plates after the central portion of the spring is pressed rearwardly, and then separating its ends.

Having thus described my invention, what I claim and desire to secure by Letters Patent is:

1. A bumper for motor vehicles comprising a spring-element and a flexible element connected at the ends thereof and tightened by engagement with the spring-element at a point between said ends.

2. A bumper for motor vehicles comprising a spring-element and an endless flexible element connected at the ends thereof and tightened by engagement with the spring-element at a point between said ends.

3. A bumper for motor vehicles comprising a spring-element and a flexible element connected at the ends thereof and tightened by engagement with the spring-element at points between said ends.

4. A bumper for motor vehicles comprising a spring of duplex reverse curvature and a tensioning chain engaging at the ends and at a central point of the spring.

5. A bumper for motor vehicles comprising a spring of duplex reverse curvature and a tensioning chain engaging at the ends of the spring and at a plurality of points of the spring between said ends.

6. A bumper for motor vehicles comprising a spring of duplex reverse curvature having reversely curved end-portions, and a tensioning chain engaging at the extremities and at an intermediate point of the spring.

7. A bumper for motor vehicles comprising a spring mounted to yield in a horizontal plane, and a tow line stretched between the ends of the spring in a plane at substantially right angles to the plane of the spring and having its ends detachably fastened together.

8. A bumper for motor vehicles comprising a spring of duplex reverse curvature, having loops at its ends, and a continuous chain having its ends detachably fastened together, the chain being reeved through the loops of the spring and engaging the spring at a point between said loops.

9. A bumper for motor vehicles comprising a spring of duplex reverse curvature, having loops at its ends, a continuous chain having its ends detachably fastened together, and a retention plate fastened to the spring between its ends and having seats to receive the chain, the chain being reeved through the loops of the spring and resting in the seats of the retention plate.

10. A bumper for motor vehicles comprising a spring of duplex reverse curvature, having loops at its ends, a continuous chain having its ends detachably fastened together, a retention plate fastened at a central portion of the spring, and retention plates fastened to the spring at opposite sides of the other, the plates having seats to receive the chain and the chain being reeved through the loops of the spring and resting in said seats.

In testimony whereof I have affixed my signature.

WILLIAM B. SEWELL.